(12) United States Patent
Mihara et al.

(10) Patent No.: US 9,112,914 B2
(45) Date of Patent: *Aug. 18, 2015

(54) WEB SERVICE PROVISION SYSTEM, SERVER DEVICE, AND METHOD

(71) Applicant: RICOH COMPANY, LTD, Ohta-ku (JP)

(72) Inventors: Akihiro Mihara, Kanagawa (JP); Takahiro Asai, Kanagawa (JP); Shigeki Ouchi, Kanagawa (JP); Kuangyi Zhu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,171

(22) Filed: Jan. 29, 2014

(65) Prior Publication Data
US 2014/0150052 A1 May 29, 2014

Related U.S. Application Data

(63) Continuation of application No. 13/206,833, filed on Aug. 10, 2011, now Pat. No. 8,689,278.

(30) Foreign Application Priority Data

Aug. 23, 2010 (JP) ................................ 2010-185744
Jun. 7, 2011 (JP) ................................ 2011-127117

(51) Int. Cl.
*H04L 29/06* (2006.01)
*G06F 21/62* (2013.01)
*H04L 29/08* (2006.01)

(52) U.S. Cl.
CPC .......... *H04L 63/205* (2013.01); *G06F 21/6245* (2013.01); *H04L 63/102* (2013.01); *H04L 67/02* (2013.01); *H04L 67/306* (2013.01)

(58) Field of Classification Search
None
See application file for complete search history.

(56) References Cited

U.S. PATENT DOCUMENTS 6,295,536 B1 * 9/2001 Sanne ................................ 1/1
8,370,420 B1 2/2013 Decasper et al.
(Continued)

FOREIGN PATENT DOCUMENTS

| JP | 2009-70015 | 4/2009 |
| JP | 2009-271919 | 11/2009 |
| JP | 2010-26653 | 2/2010 |

OTHER PUBLICATIONS

Office Action issued Dec. 16, 2014, in Japanese Patent Application No. 2011-127117.

(Continued)

*Primary Examiner* — David Pearson
(74) *Attorney, Agent, or Firm* — Oblon, McClelland, Maier & Neustadt, L.L.P.

(57) ABSTRACT

A web application server includes a user information management unit that manages user IDs and attributes such that each of the user IDs is associated with corresponding one of the attributes, a security policy management unit that manages security policies such that each of security policies is associated with corresponding one of the attributes, a security policy acquisition unit that acquires one of the security policies based on one of the attributes associated with one of the user IDs, and an HTML file generation unit that generates an HTML file in which a script to acquire personal data of corresponding one of users from an intra-company database server is embedded based on one of the security policies of the corresponding one of the users.

20 Claims, 15 Drawing Sheets

(56) References Cited

U.S. PATENT DOCUMENTS

| | | | |
|---|---|---|---|
| 2005/0203892 A1* | 9/2005 | Wesley et al. | 707/3 |
| 2009/0249440 A1 | 10/2009 | Platt et al. | |
| 2010/0017415 A1 | 1/2010 | Kurumai et al. | |
| 2010/0332456 A1 | 12/2010 | Prahlad et al. | |
| 2013/0227015 A1 | 8/2013 | Mihara et al. | |

OTHER PUBLICATIONS

Hiroshi Kubota et al., "Analysis of Popular Web Services, Part 3, Google Apps—Strengthening Business-Specific Functions, Spreading Out From PCs," Nikkei Network, No. 118, Japan, Nikkei BP, Jan. 2010, [ISSN] 1345-482X, pp. 46-51 (*with English translation*).

George Zhou et al., "Design and Implementation of Distributed Component Framework for Cloud Services," Proceedings of the $72^{nd}$ National Convention of Information Processing Society of Japan, vol. 3, Mar. 8, 2010, pp. 3-391-3-392 (*with English translation*).

Masashi Shimizu, "Technique for Establishing a Soho Network in Always-On-Connection Era (6): User Management by Active Directory," [online], ITmedia Inc., Japan, May 11, 2011, [Search Date: Apr. 12, 2014], Internet URL http://www.atmarkit.co.jp/ait/articles/0105/11/news002.html (*with English translation*).

Anne Van Kesteren, Cross-Origin Resource Sharing, W3C Working Draft Mar. 17, 2009, [Search Date: Apr. 12, 2014], Internet URL, http://www.w3.org/TR/2009/WD-cors-20090317/#access-control-allow-credentials-response.

\* cited by examiner

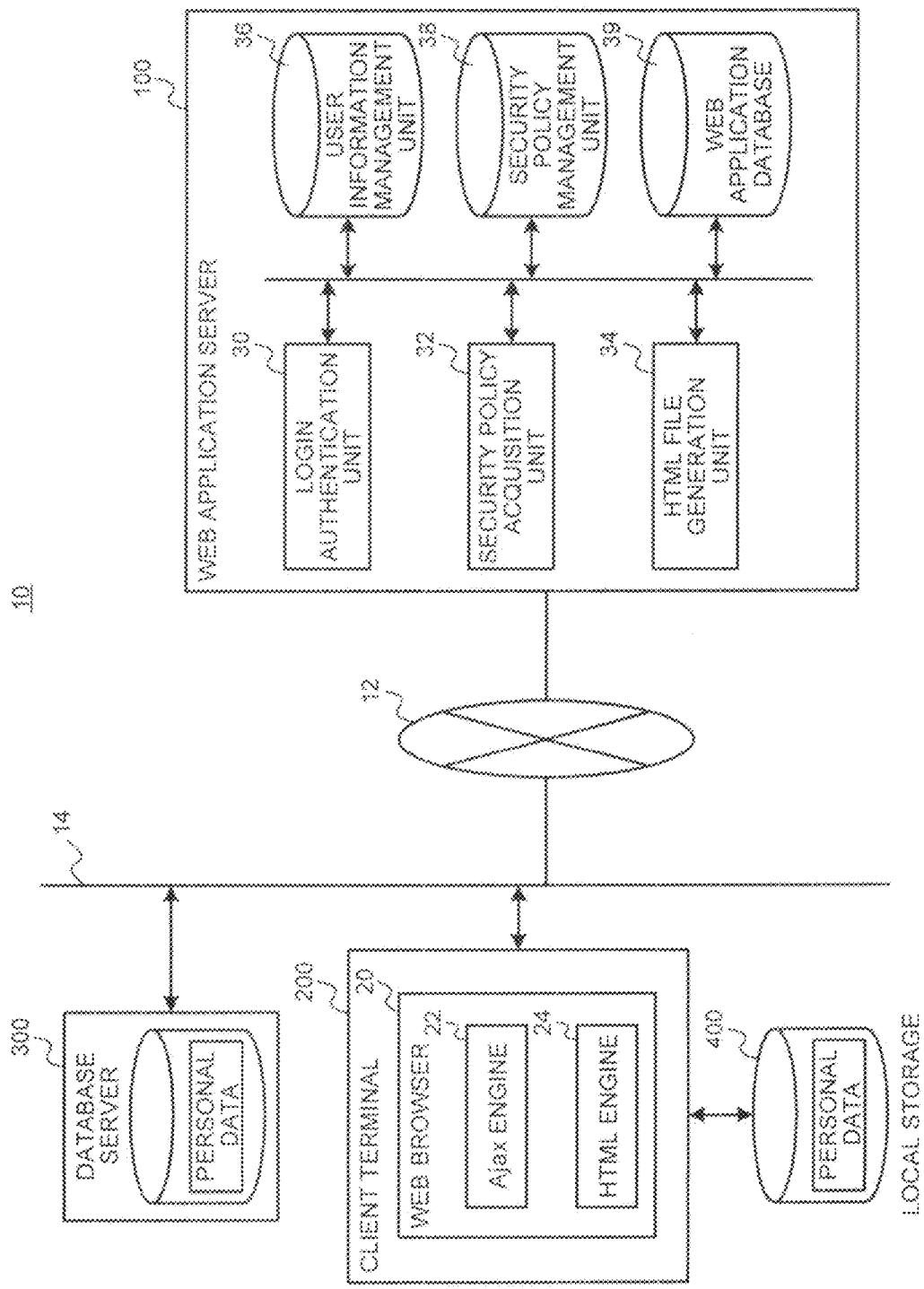

FIG.3

| LOGIN INFORMATION | | ATTRIBUTE | | | |
|---|---|---|---|---|---|
| USER ID | PASSWORD | USER NAME | COMPANY NAME | DEPARTMENT | TITLE |
| USER-A1 | 123abc | YAMADA | COMPANY A | SALES DEPARTMENT | DIVISION MANAGER |
| USER-A2 | 456def | SUZUKI | COMPANY A | SALES DEPARTMENT | NOTHING |
| USER-A3 | 789ghi | TANAKA | COMPANY A | DEVELOPMENT DEPARTMENT | SENIOR STAFF MEMBER |
| ⋮ | ⋮ | ⋮ | ⋮ | ⋮ | ⋮ |
| USER-B1 | 234jkl | YAMAMOTO | COMPANY B | GENERAL AFFAIRS DEPARTMENT | NOTHING |
| USER-B2 | 567mno | SATO | COMPANY B | HUMAN RESOURCES DEPARTMENT | ASSISTANT MANAGER |
| ⋮ | ⋮ | ⋮ | ⋮ | ⋮ | ⋮ |
| USER-C1 | 891pqr | OTA | COMPANY C | SALES DEPARTMENT | MANAGER |
| USER-C2 | 234stu | SAITO | COMPANY C | ACCOUNTING DEPARTMENT | NOTHING |
| ⋮ | ⋮ | ⋮ | ⋮ | ⋮ | ⋮ |

| SERVICE NAME: PHOTOGRAPH MANAGEMENT: http://www.app.com/shasinnkannri | | |
|---|---|---|
| SERVICE NAME: MEETING MINUTE: http://www.app.com/gijiroku | | |
| SERVICE NAME: CALENDAR: http://www.app.com/calender | | |
| ATTRIBUTE | SECURITY POLICY | |
| | STORAGE PLACE | URL |
| COMPANY A/SALES DEPARTMENT/ NOTHING | OUTSIDE COMPANY | — |
| ⇨ COMPANY A/SALES DEPARTMENT/ DIVISION MANAGER | INSIDE COMPANY | intra.acompany.co.jp/calender |
| COMPANY A/DEVELOPMENT DEPARTMENT/NOTHING | INSIDE COMPANY | intra.acompany.co.jp/calender |
| ⋮ | ⋮ | ⋮ |
| COMPANY B/SALES DEPARTMENT/ NOTHING | OUTSIDE COMPANY | — |
| ⋮ | ⋮ | ⋮ |
| COMPANY C/ACCOUNTING DEPARTMENT/NOTHING | INSIDE COMPANY | intra.ccompany.co.jp/calender |
| ⋮ | ⋮ | ⋮ |

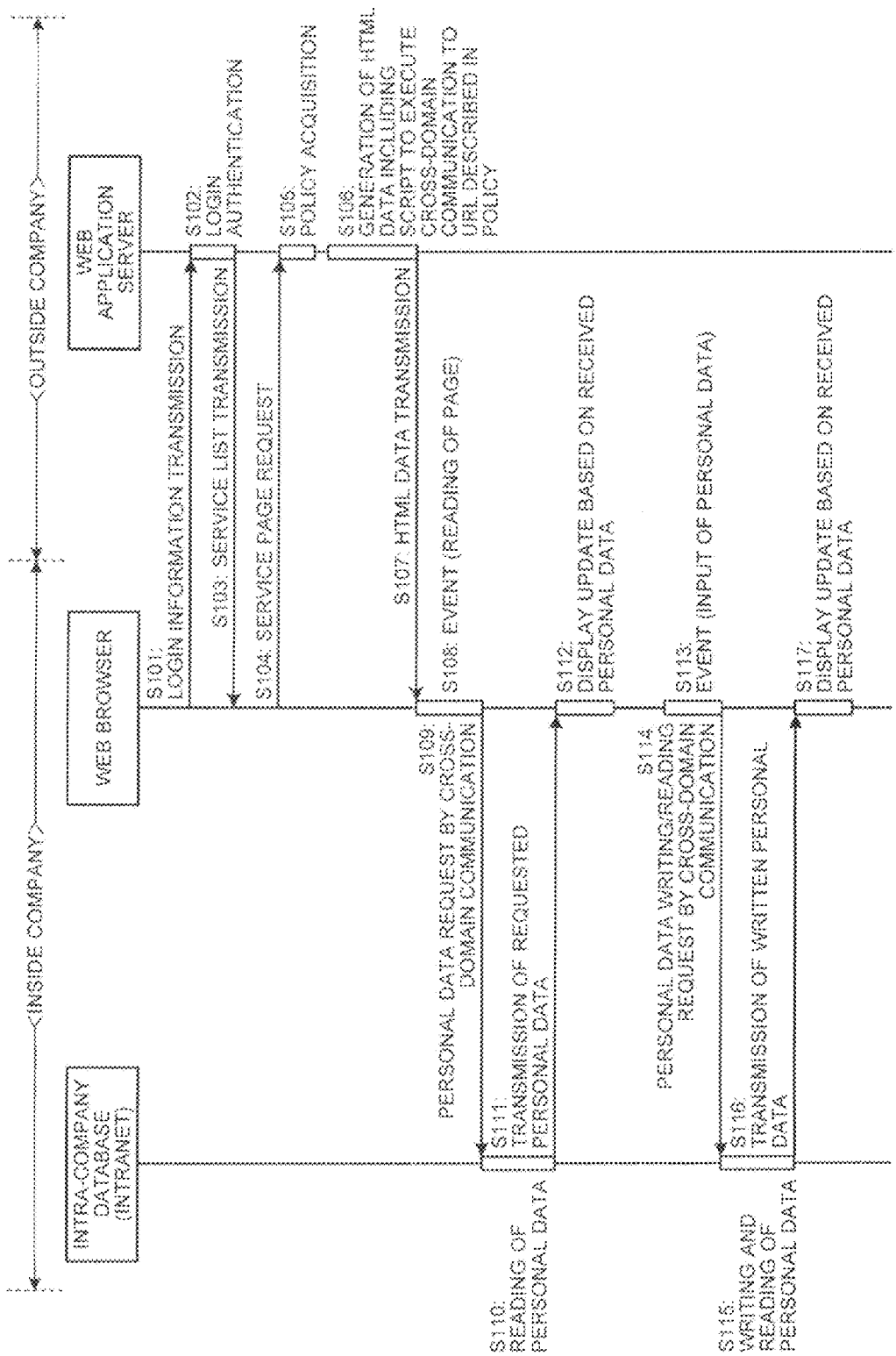

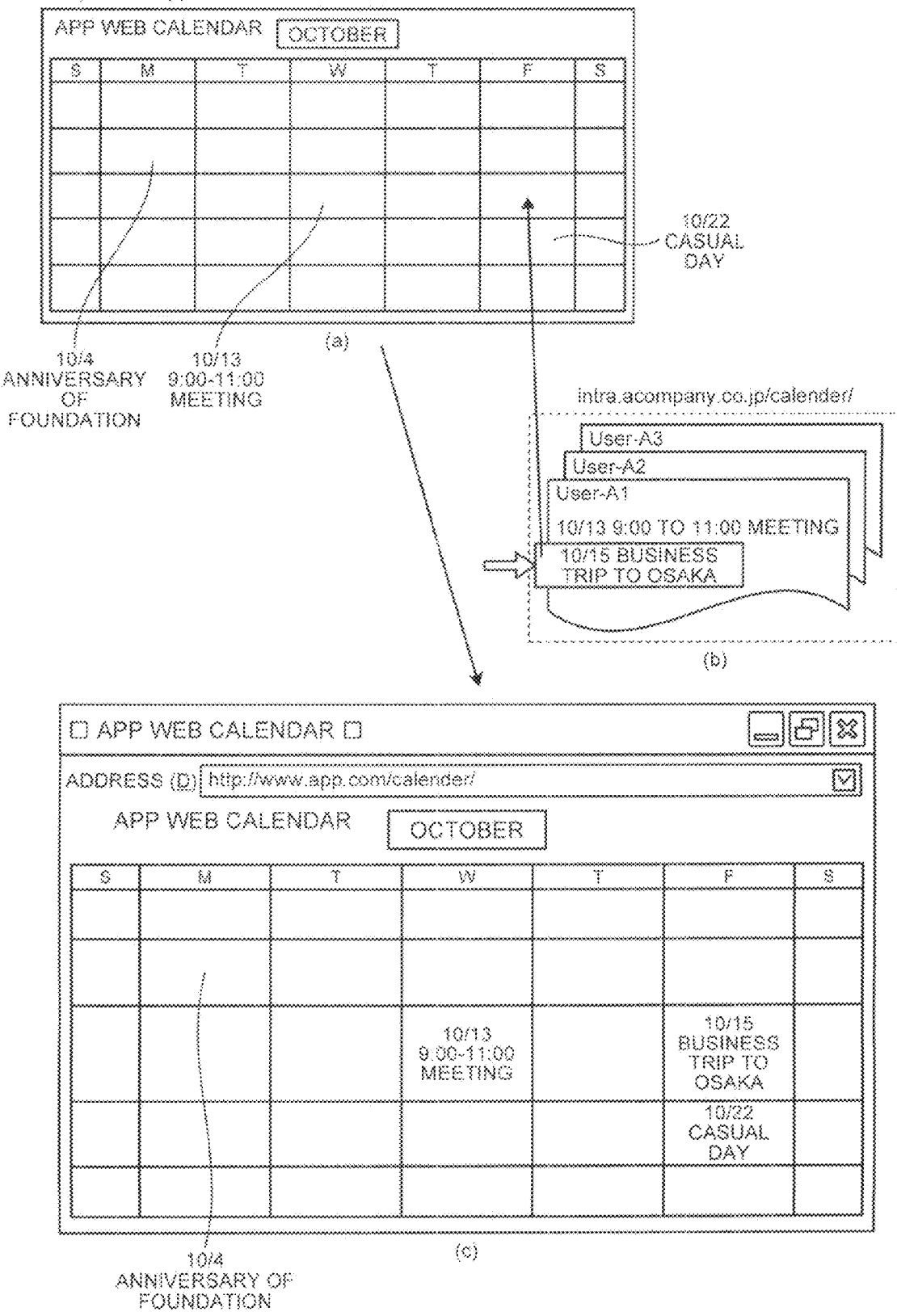

| SERVICE NAME: PHOTOGRAPH MANAGEMENT: http://www.app.com/shasinnkannri |||
| SERVICE NAME: MEETING MINUTE: http://www.app.com/gijiroku |||
| SERVICE NAME: CALENDAR: http://www.app.com/calender |||
| ATTRIBUTE | SECURITY POLICY ||
| | STORAGE PLACE | URL |
| --- | --- | --- |
| COMPANY A/SALES DEPARTMENT/ NOTHING | OUTSIDE COMPANY | — |
| COMPANY A/SALES DEPARTMENT/ DIVISION MANAGER | INSIDE COMPANY | intra.acompany.co.jp/calender |
| COMPANY A/DEVELOPMENT DEPARTMENT/NOTHING | INSIDE COMPANY | intra.acompany.co.jp/calender |
| ⋮ | ⋮ | ⋮ |
| COMPANY B/SALES DEPARTMENT/ NOTHING | OUTSIDE COMPANY | — |
| ⋮ | ⋮ | ⋮ |
| COMPANY C/ACCOUNTING DEPARTMENT/NOTHING | INSIDE COMPANY | intra.ccompany.co.jp/calender |
| ➪ COMPANY C/SALES DEPARTMENT/ DIVISION MANAGER | LOCAL | |
| ⋮ | ⋮ | ⋮ |

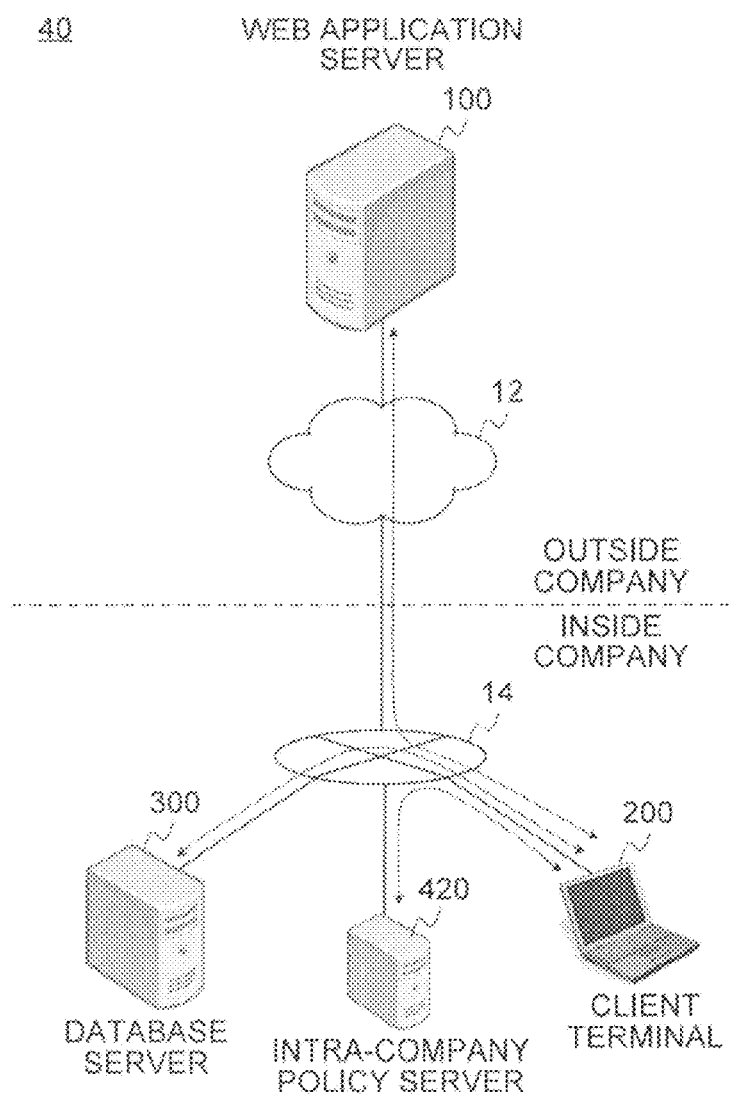

| SERVICE NAME: PHOTOGRAPH MANAGEMENT: http://www.app.com/shasinnkannri | | |
|---|---|---|
| SERVICE NAME: MEETING MINUTE: http://www.app.com/gijiroku | | |
| SERVICE NAME: CALENDAR: http://www.app.com/calender | | |
| ATTRIBUTE | SECURITY POLICY | |
| | STORAGE PLACE | URL |
| COMPANY A/SALES DEPARTMENT/ NOTHING | OUTSIDE COMPANY | --- |
| COMPANY A/SALES DEPARTMENT/ DIVISION MANAGER | INSIDE COMPANY | intra.acompany.co.jp/calender |
| COMPANY A/DEVELOPMENT DEPARTMENT/NOTHING | INSIDE COMPANY | intra.acompany.co.jp/calender |
| : | : | : |
| COMPANY B/SALES DEPARTMENT/ NOTHING | OUTSIDE COMPANY | --- |
| : | : | : |
| COMPANY C/*/* | POLICY REFERENCE DESTINATION: intra.ccompany.co.jp/policy | |
| : | : | : |

| SERVICE NAME: CALENDAR: http://www.app.com/calender | | |
|---|---|---|
| ATTRIBUTE | COMPANY C'S SECURITY POLICY | |
| | STORAGE PLACE | URL |
| SALES DEPARTMENT/NOTHING | OUTSIDE COMPANY | --- |
| SALES DEPARTMENT/DIVISION MANAGER | INSIDE COMPANY | intra.acompany.co.jp/calender |
| DEVELOPMENT DEPARTMENT/ NOTHING | INSIDE COMPANY | intra.acompany.co.jp/calender |
| GENERAL AFFAIRS DEPARTMENT/* | OUTSIDE COMPANY | --- |
| ACCOUNTING DEPARTMENT/* | INSIDE COMPANY | intra.acompany.co.jp/calender |
| : | : | : |

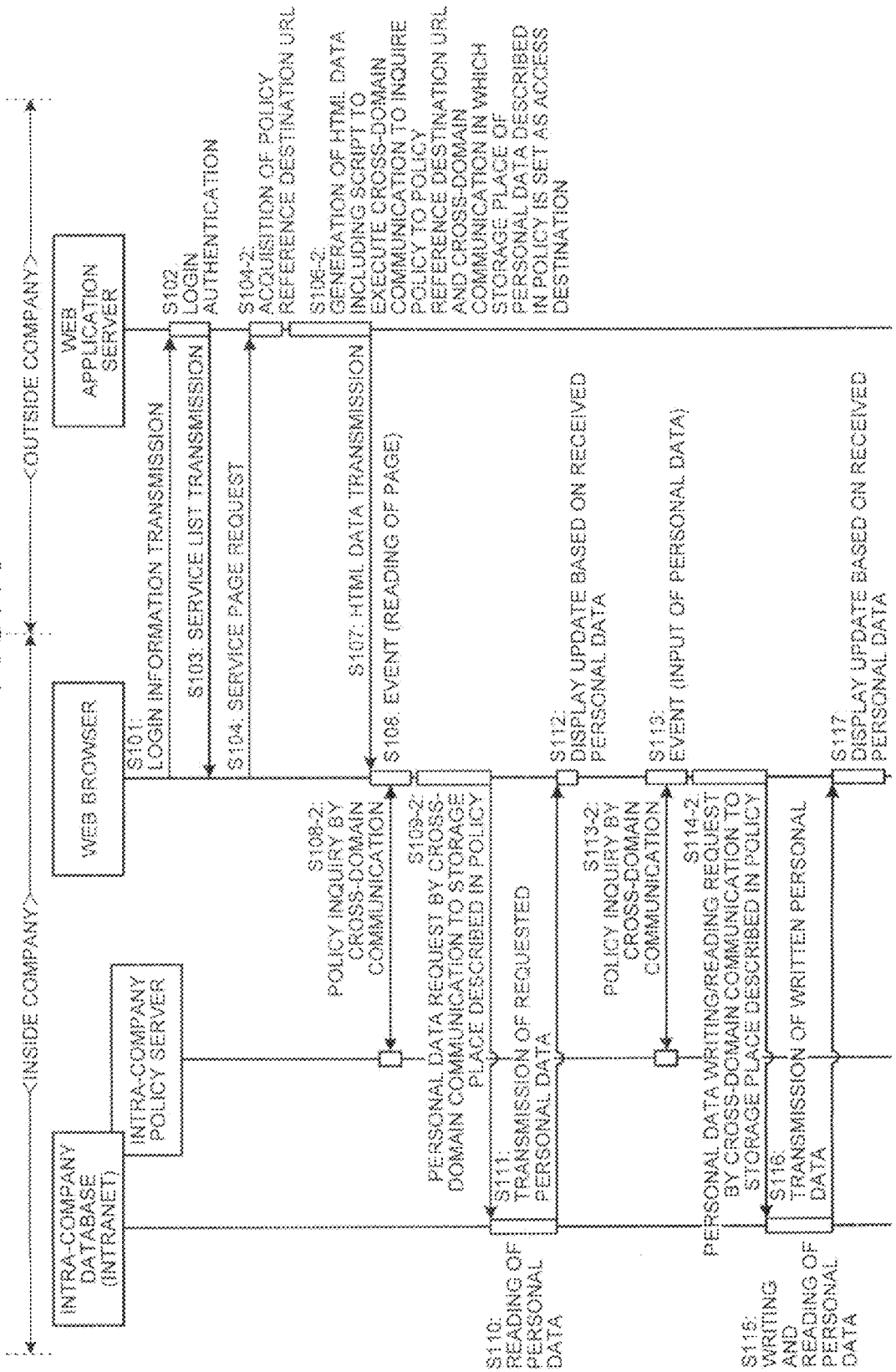

| SERVICE NAME: ADDRESS BOOK OF COMPANIES: | | |

600

| SERVICE NAME: MEETING MINUTE: http://www.app.com/gijiroku | | |
|---|---|---|
| ATTRIBUTE | SECURITY POLICY | |
| | STORAGE PLACE | URL |
| → COMPANY A/SALES DEPARTMENT/ NOTHING | OUTSIDE COMPANY | — |
| COMPANY A/SALES DEPARTMENT/ DIVISION MANAGER | INSIDE COMPANY | intra.acompany.co.jp/gijiroku |
| ⋮ | ⋮ | ⋮ |
| COMPANY B/SALES DEPARTMENT/ NOTHING | OUTSIDE COMPANY | — |
| ⋮ | ⋮ | ⋮ |
| COMPANY C/ACCOUNTING DEPARTMENT/NOTHING | INSIDE COMPANY | intra.ccompany.co.jp/gijiroku |
| ⋮ | ⋮ | ⋮ |

| SERVICE NAME: ADDRESS BOOK OF COMPANIES: | | |
|---|---|---|
| ATTRIBUTE | SECURITY POLICY | |
| | STORAGE PLACE | URL |
| → COMPANY A/*/* | INSIDE COMPANY | intra.acompany.co.jp/address |
| COMPANY B/*/* | INSIDE COMPANY | intra.bcompany.co.jp/address |
| COMPANY C/*/* | INSIDE COMPANY | intra.ccompany.co.jp/address |
| ⋮ | ⋮ | ⋮ |

WEB SERVICE PROVISION SYSTEM, SERVER DEVICE, AND METHOD

CROSS-REFERENCE TO RELATED APPLICATIONS

This application is a continuation of U.S. Ser. No. 13/206,833, filed Aug. 10, 2011, which claims priority to Japanese Patent Application No. 2010-185744 filed in Japan on Aug. 23, 2010 and Japanese Patent Application No. 2011-127117 filed in Japan on Jun. 7, 2011, the entire contents of both of which are incorporated herein by reference.

BACKGROUND OF THE INVENTION

1. Field of the Invention

The present invention relates to a web service provision system.

2. Description of the Related Art

In recent years, a new utilization form of software using the Internet referred to as "software as a service (SaaS)" has been in the spotlight. In the past, in order to use software, a user needed to purchase a software package and then install it in his/her personal computer (PC). Meanwhile, in SaaS, software operates only in a web application server managed by a web service provider outside a company, and a user uses functions of software with a web browser of a client terminal connected to the web application server over the Internet. According to SaaS, the initial cost entailed in server installation and the maintenance cost subsequent thereto become unnecessary, and it is possible to flexibly cope with an increase or decrease in the system scale. Thus, companies are increasingly changing their business applications such as mail or groupware to SaaS recently.

Japanese Patent Application Laid-open No. 2009-070015 discloses a system in which an inside SaaS server having the same applications as those in an outside SaaS server is provided in a company, and a database inside a company is synchronized with a database outside the company so that the data desired to share can be shared between the inside and outside of the company.

SUMMARY OF THE INVENTION

It is an object of the present invention to at least partially solve the problems in the conventional technology.

According to an aspect of the present invention, there is provided a web service provision system, including: a web application server that executes a web application; a client terminal on which a web browser is installed; and a database server connected to the client terminal through an intranet. The web application server includes: a user information management unit that manages user IDs and attributes such that each of the user IDs is associated with corresponding one of the attributes, a security policy management unit that manages security policies such that each of the security policies is associated with corresponding one of the attributes, each of the security policies defining the web application server or the database server as a storage destination of personal data of corresponding one of users, a security policy acquisition unit that acquires one of the security policies based on one of the attributes associated with one of the user IDs transmitted from the web browser, and an HTML file generation unit that generates an HTML file based on the one of the security policies acquired by the security policy acquisition unit.

According to another aspect of the present invention, there is provided a web application server that is connected with a client terminal through an Internet, the client terminal having a web browser installed thereon and being connected to a database server through an intranet, the web application server including: a user information management unit that manages user IDs and attributes such that each of the user IDs is associated with corresponding one of the attributes; a security policy management unit that manages security policies such that each of the security policies is associated with corresponding one of the attributes, each of the security policies defining any one of the web application server and the database server as a storage destination of personal data of corresponding one of users; a security policy acquisition unit that acquires one of the security policies based on one of the attributes associated with one of the user IDs transmitted from the web browser; and an HTML file generation unit that generates an HTML file based on the one of the security policies acquired by the security policy acquisition unit.

According to still another aspect of the present invention, there is provided a method of providing a web service by a web application server connected to a client terminal through an Internet, the client terminal having a web browser installed thereon and being connected to a database server through an intranet, the method including: managing, by the web application server, user IDs and attributes such that each of the user IDs is associated with corresponding one of the attributes; managing, by the web application server, security policies such that each of the security policies is associated with corresponding one of the attributes, each of the security policies defining any one of the web application server and the database server as a storage destination of personal data of corresponding one of users; acquiring, by the web application server, one of the security policies based on one of the attributes associated with one of the user IDs transmitted from the web browser; and generating, by the web application server, an HTML file based on the one of security policies acquired in the acquiring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a functional block diagram of devices that configure the web service provision system according to the first embodiment;

FIG. 3 is a diagram illustrating a user information management table according to the first embodiment;

FIG. 4 is a diagram illustrating a security policy management table according to the first embodiment;

FIG. 5 is a sequence diagram of a process executed by the web service provision system according to the first embodiment;

FIG. 8 is a diagram illustrating a screen displayed by a web browser according to the first embodiment;

FIG. 9 is a diagram illustrating a security policy management table according to a second embodiment;

FIG. 11 is a network diagram of a web service provision system according to a third embodiment;

FIGS. 12A and 12B are diagrams illustrating a security policy management table according to the third embodiment;

FIG. 13 is a sequence diagram of a process executed by the web service provision system according to the third embodiment;

FIGS. 15A and 15B are diagrams illustrating a security policy management table according to the fourth embodiment.

DETAILED DESCRIPTION OF THE PREFERRED EMBODIMENTS

Figure 1:
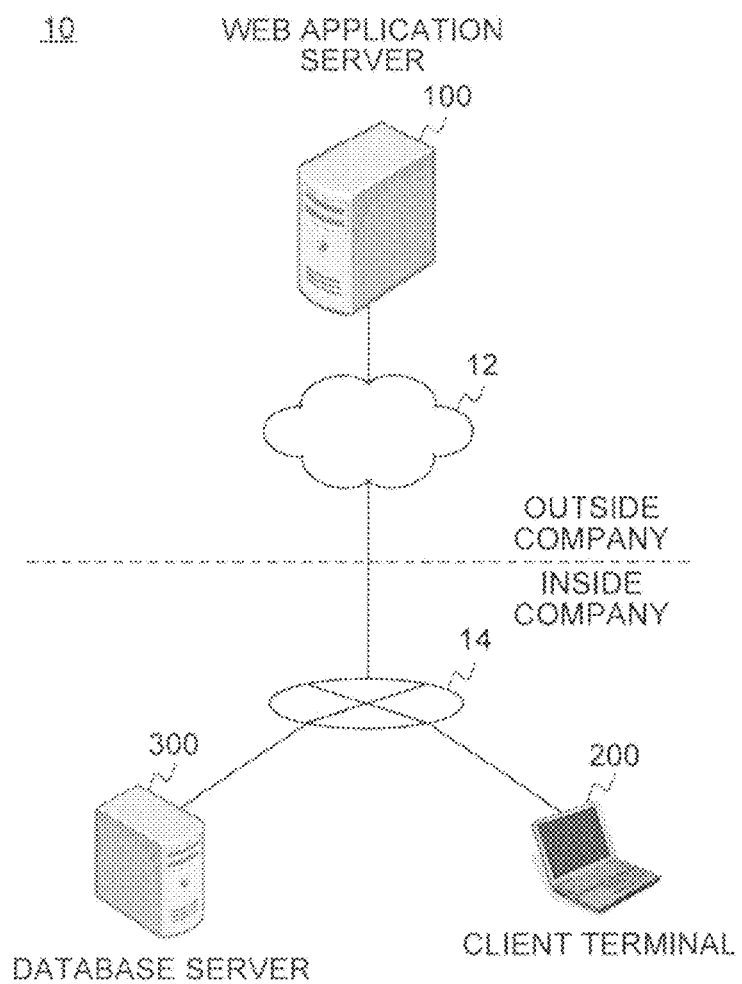
FIG. 1 is a network diagram of a web service provision system according to a first embodiment.

As a result of keen study on a novel web service provision system capable of reducing a security risk while maintaining the cost merit of SaaS, the inventors have found a configuration in which a database server managing data of a web service is disposed inside a company, and data is distributed to a storage destination inside or outside a company based on a previously defined security policy, leading to achievement of the present invention.

Hereinafter, exemplary embodiment of the present invention will be described, but the present invention is not limited to the following embodiments. In the drawings referred to hereinafter, like parts are denoted by like reference numerals, and a redundant description will not be repeated.

FIG. 1 is a network diagram of a web service provision system 10 according to an embodiment of the present invention. The web service provision system 10 according to the present embodiment is configured to include a web application server 100 which can be referred to as "SaaS server," a client terminal 200 which can be referred to as "user terminal of a SaaS service," and a database server 300 which is under the user' management. The web application server 100 is connected with the client terminal 200 through the Internet 12; and the client terminal 200 is connected with the database server 300 through an intranet 14.

In the web service provision system 10 according to the present embodiment, the web application server 100 provides the user with at least one web service through a web browser installed on the client terminal 200. Specifically, the web browser of the client terminal 200 first transmits a Hyper Text Transfer Protocol (HTTP) request to the web application server 100. The web application server 100 retrieves a database based on the content of the HTTP request, executes a predetermined business logic process, and generates a Hyper Text Markup Language (HTML) file representing an execution result. The generated HTML file is transmitted to the web browser as an HTTP response, and the web browser analyzes the HTML file and displays an HTML page.

In the web service provision system 10, data used for a web service is basically stored in a database (not shown) at the web application server 100 installed outside a company; but it may be undesirable to store data outside the company depending on the content of data. For this reason, according to the web service provision system 10 of the present embodiment, some of information with high security request is selectively stored in the database server 300 installed inside the company while an application function provided by the web application server 100 installed outside the company is used. Accordingly, a security risk such as information leaks or data loss is appropriately reduced. This point will be described below in detail.

FIG. 2 is a functional block diagram of devices that configure the web service provision system 10 according to the present embodiment.

The web application server 100 includes an application layer configured with a login authentication unit 30, a security policy acquisition unit 32, an HTML file generation unit 34, and a data layer configured with a user information management unit 36, a security policy management unit 38, and a web application database 39. The web application server 100 provides the user with at least one web service. In FIG. 2, for convenience of description, the web application server in which the application layer is integrated with the data layer is illustrated as a web service provision system; but a web service provision side system is generally configured with an application server specialized for a function of the application layer and a database server communicating with the application server.

First, a description will be made in connection with the data layer of the web application server 100. The user information management unit 36 according to the present embodiment includes a user information management table 500 illustrated in FIG. 3. In the user information management table 500 exemplified in FIG. 3, a user ID and a password are stored as login information; and a user's attribute (a user name, a company name, a department, and a title) is stored to be associated with the user ID. Types of attribute items are not limited to those illustrated in FIG. 3, and an appropriate item may be appropriately set in view of the security policy formulation.

Next, the security policy management unit 38 according to the present embodiment includes a security policy management table 600 illustrated in FIG. 4. The security policy management table 600 exemplified in FIG. 4 manages security policies, which have been defined for each service provided by the web application server 100, so as to be associated with the user's attribute. The security policy according to the present embodiment describes a storage place of data (the inside of the company or the outside of the company) and a storage destination (access destination) uniform resource locator (URL). In a column of the storage destination URL of data, when the storage place of data is the inside of the company, described is a URL of the intra-company database server 300 connected with the client terminal 200 over the intranet. Further, when the storage place of data is the outside of the company, described is setting to maintain a URL of a page currently displayed by the web browser as a communication destination (in FIG. 4, corresponding setting is indicated by "-"). Information stored in the user information management table 500 and the security policy management table 600 is set such that a user side administrator (for example, an IT manager) requests a web service provider managing the web application server 100 to perform setting of the information.

Lastly, the web application database 39 stores and manages a variety of data including personal data used to implement web services.

Next, a description will be made in connection with the application layer of the web application server 100. The login authentication unit 30 according to the present embodiment executes an authentication process by comparing a user ID and a password (login information) received from a web browser 20 with the login information stored in the user information management table 500. In response to an HTTP request from the web browser 20, the security policy acquisition unit 32 retrieves the security policy management table 600 illustrated in FIG. 4 using the attribute associated with the received user ID as a key and acquires the security policy corresponding to that attribute. The HTML file generation unit 34 generates an HTML file based on the acquired security policy and transmits the generated HTML file to the web browser 20 as an HTTP response.

Next, a description will be made in connection with the client terminal 200 according to the present embodiment. The client terminal 200 according to the present embodiment may be configured as a PC and has the web browser 20 installed therein. The web browser 20 according to the present embodiment supports Asynchronous JavaScript (a registered trademark) and Extensible Markup Language (XML) ("Ajax") and can execute asynchronous communication with a server. Further, the web browser 20 according to the present embodiment has a cross-domain communication function that makes possible HTTP communication with a server in a domain different from that of a displayed page. Examples of the web browser 20 having the Ajax function and the cross-domain communication function include Firefox 3.5 in which XMLHttpRequest Level 2 is installed, Google Chrome 3, Safari 4, or Internet Explorer 8 in which XDomainRequest is installed. In FIG. 2, among functions of the web browser 20, a functional unit that performs asynchronous communication with the intra-company database server 300 and acquires the user's personal data is designated as an Ajax engine 22; and basic functions such as an HTTP user agent, a parser, and a renderer are designated as an HTML engine 24.

There has been described hereinbefore the functional units of the devices that configure the web service provision system 10 according to the present embodiment. Next, a description will be made in connection with the details of a process executed by the web service provision system 10 according to the present embodiment. The following description will be made under the assumption that the web application server 100 provides three web services of "calendar," "meeting minute," and "photograph management," and "Yamada of a company A" who has been registered in the user information management table 500 illustrated in FIG. 3, uses the web service "calendar" as an example.

Figure 6A:
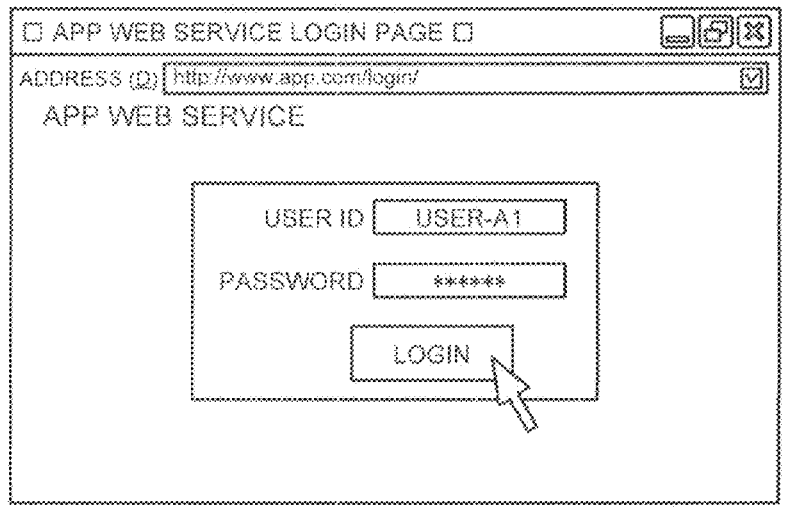
FIGS. 6A to 6C are diagrams illustrating a screen displayed by a web browser according to the first embodiment.

FIG. 5 is a sequence diagram of a process performed by the web service provision system 10. First, "Yamada" who is the user of the client terminal 200 inputs "USER-A1" as a user ID and "123abc(******)" as a password through the web browser 20 and clicks a login icon as illustrated in FIG. 6A; and so the login information (the user ID and the password) is transmitted to the web application server 100 (step S101).

Figure 6B:
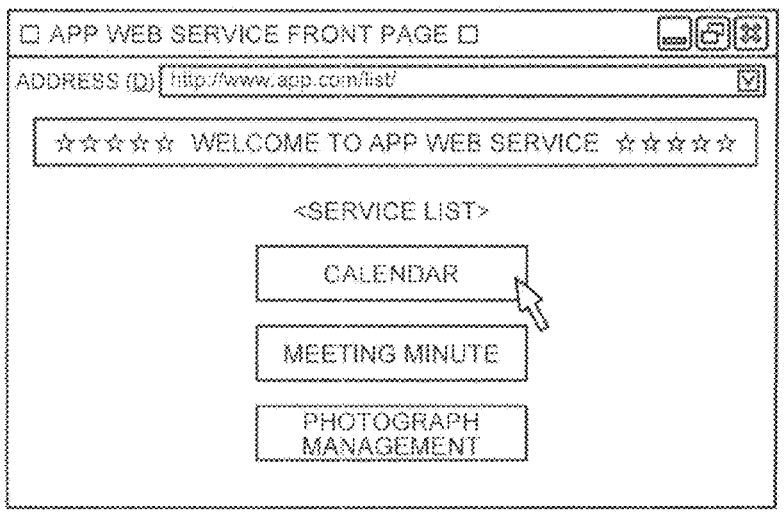

The web application server 100 executes the user authentication process by comparing the received user ID and the password with the login information stored in the user information management table 500 (step S102). When the user authentication succeeds, the web application server 100 transmits a service list page to the web browser 20 (step S103); and the web browser 20 displays the service list page. FIG. 6B illustrates the displayed service list page. On the service list page, displayed are selection icons of three web services ("calendar," "meeting minute," and "photograph management") which can be provided from the web application server 100. When the user clicks the "calendar" icon, the web browser 20 transmits a service page request to the web application server 100 (step S104).

When the service page request is received, the web application server 100 retrieves the user information management table 500 and acquires an attribute associated with the received user ID; and retrieves the security policy management table 600 using the acquired attribute as a key and acquires a security policy corresponding to that attribute (step S105). Referring to FIG. 3, the attribute associated with the user ID "USER-A1" of the user "Yamada" includes "Yamada (user name), company A (company name), sales department (department), and division manager (title)." The security policy management table 600 illustrated in FIG. 4 is retrieved using the attribute as a key. As a result, acquired is a security policy, in which a storage place is the inside of the company and a URL is "intra.acompany.co.jp/calender," stored in a field indicated by an arrow in FIG. 4.

Figure 6C:
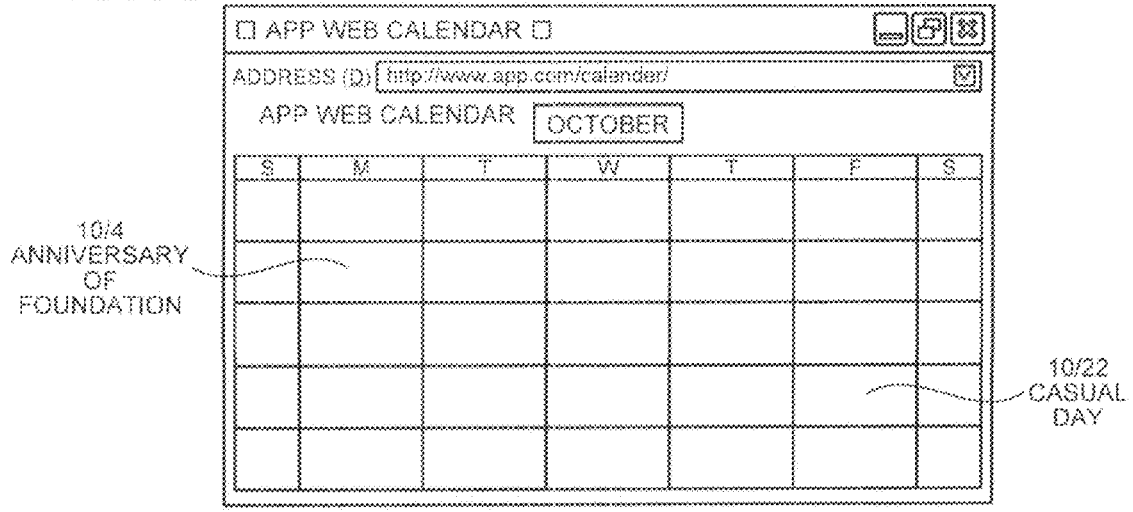

Next, the web application server 100 generates an HTML file based on the acquired security policy. Specifically, an HTML file to display a calendar page illustrated in FIG. 6C is generated using a variety of data stored in the web application database 39. Here, according to the security policy of the user "Yamada," since a storage destination of information is "the inside of the company," personal data of the user "Yamada" is not placed in the web application database 39. Thus, as illustrated in FIG. 6C, the web application server 100 can reflect shared information of the company A (an anniversary of foundation, October 4th and a casual day, October 22nd) on the calendar page; but in this state, but a personal schedule of the user "Yamada" is not reflected on the calendar page at this rate.

In this regard, in the present embodiment, an HTML file in which JavaScript (a registered trademark) to acquire the user's personal data from the intra-company database server 300 is embedded is generated by the following procedure (step S106). First, it is judged whether the "storage place" described in the acquired security policy is the inside of the company or the outside of the company. Since the storage place is the inside of the company as indicated by an arrow in FIG. 4, in response to this, generated is JavaScript (a registered trademark) to execute cross-domain communication, in which the intra-company database server 300 of the company A is designated as the communication destination of XMLHttpRequest, to acquire Yamada's personal data. Here, a URL (=intra.acompany.co.jp/calender) described in the acquired security policy is designated as the communication destination of XMLHttpRequest. Lastly, the generated JavaScript (a registered trademark) is embedded in an HTML file to display the calendar page illustrated in FIG. 6C, so that the HTML file is completed. In the HTML file, an appropriate event is designated as a trigger of XMLHttpRequest. In the present embodiment, "reading of a page" and "input of personal data" may be used as the trigger of XMLHttpRequest. The generated HTML file is transmitted to the web browser 20 as the HTTP response (step S107).

Figure 7:
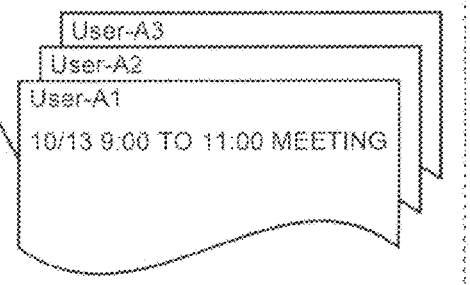
FIG. 7 is a diagram illustrating a screen displayed by a web browser according to the first embodiment.

When the received HTML file is read through the web browser 20 (step S108), JavaScript (a registered trademark) is triggered by such event and executed; and so the personal data of the user "Yamada" is requested by XMLHttpRequest in which the URL (=intra.acompany.co.jp/calender) of the intra-company database server 300 of the company A is designated as the communication destination (step S109). In the intra-company database server 300, as illustrated in FIG. 7(b), personal data (for example, a personal schedule) of each user of the company A is managed for each user ID. The intra-company database server 300 reads the personal data of the user "Yamada" (=a meeting from 9:00 to 11:00, October 13) in response to the request from the web browser 20 (step S110); and then transmits the personal data of the user "Yamada" to the web browser 20 by XMLHttpRequest (step S111).

The web browser 20 generates a calendar page by binding the personal data of the user "Yamada" (a meeting from 9:00 to 11:00, October 13) received from the intra-company database server 300 and the HTML file to display a page indicated in FIG. 7(a) which has been previously received from the web application server 100 and stored in a cache (step S112). FIG. 7(c) illustrates the calendar page generated by binding the personal data of the user and the HTML file. As illustrated in FIG. 7(c), in addition to the shared information of the company A (an anniversary of foundation, October 4th and a casual day, October 22nd), the personal schedule of the user "Yamada" (a meeting from 9:00 to 11:00, October 13) is reflected on the calendar page after the binding.

Next, a description will be made in connection with a case in which, after the calendar page is displayed, the user inputs personal data within the same session as that in which the calendar page is displayed. When the user "Yamada" inputs personal data through a predetermined personal data input interface provided by the web browser 20 (step S113), JavaScript (a registered trademark) is triggered by such event and executed; and a request to write the input personal data in a file of the user "Yamada" and read the written person data is transmitted through XMLHttpRequest in which the URL (=intra.acompany.co.jp/calender) of the intra-company database server 300 of the company A is designated as the communication destination (step S114). The intra-company database server 300 receives this request and updates the personal data by writing newly input personal data (a business trip to Osaka, October 15) in the file (User-A1) of the user "Yamada" as illustrated in FIG. 8(b) (step S115). Then, the intra-company database server 300 reads the newly written personal data (a business trip to Osaka, October 15) and transmits the newly written personal data to the web browser 20 (step S116).

The web browser 20 updates the calendar page by binding the personal data of the user "Yamada" (a business trip to Osaka, October 15) received from the intra-company database server 300 and the HTML page data illustrated in FIG. 8(a) which are stored in the cache (step S117). FIG. 8(c) illustrates the updated calendar page. As illustrated in FIG. 8(c), in addition to the shared information of the company A (an anniversary of foundation, October 4th and a casual day, October 22nd) and the personal schedule of the user "Yamada" (a meeting from 9:00 to 11:00, October 13), the personal schedule (a business trip to Osaka, October 15) newly input by the user "Yamada" is reflected on the calendar page.

As described above, according to the web service provision system 10 of the present embodiment, information with low security request can be shared through the SaaS server outside the company similarly to the conventional SaaS outside the company, whereas some of information with high security request is automatically retained inside the company.

Meanwhile, according to the present invention, for example, a database stored in a local storage 400 (see FIG. 2) locally connected to the client terminal 200 may be used as a storage destination of highly confidential personal data that is not desired to open even inside the company. A description will be made below in connection with a second embodiment in which a local storage is used as a storage destination of personal data.

FIG. 9 illustrates a security policy management table 620 according to the second embodiment. In the security policy management table 620 illustrated in FIG. 9, the security policy has "local" (that is, the local storage 400 locally connected to the client terminal 200) as an option of a storage place of data in addition to "inside of company" and "outside of company", and a URL field of corresponding row is blank.

Figure 10:
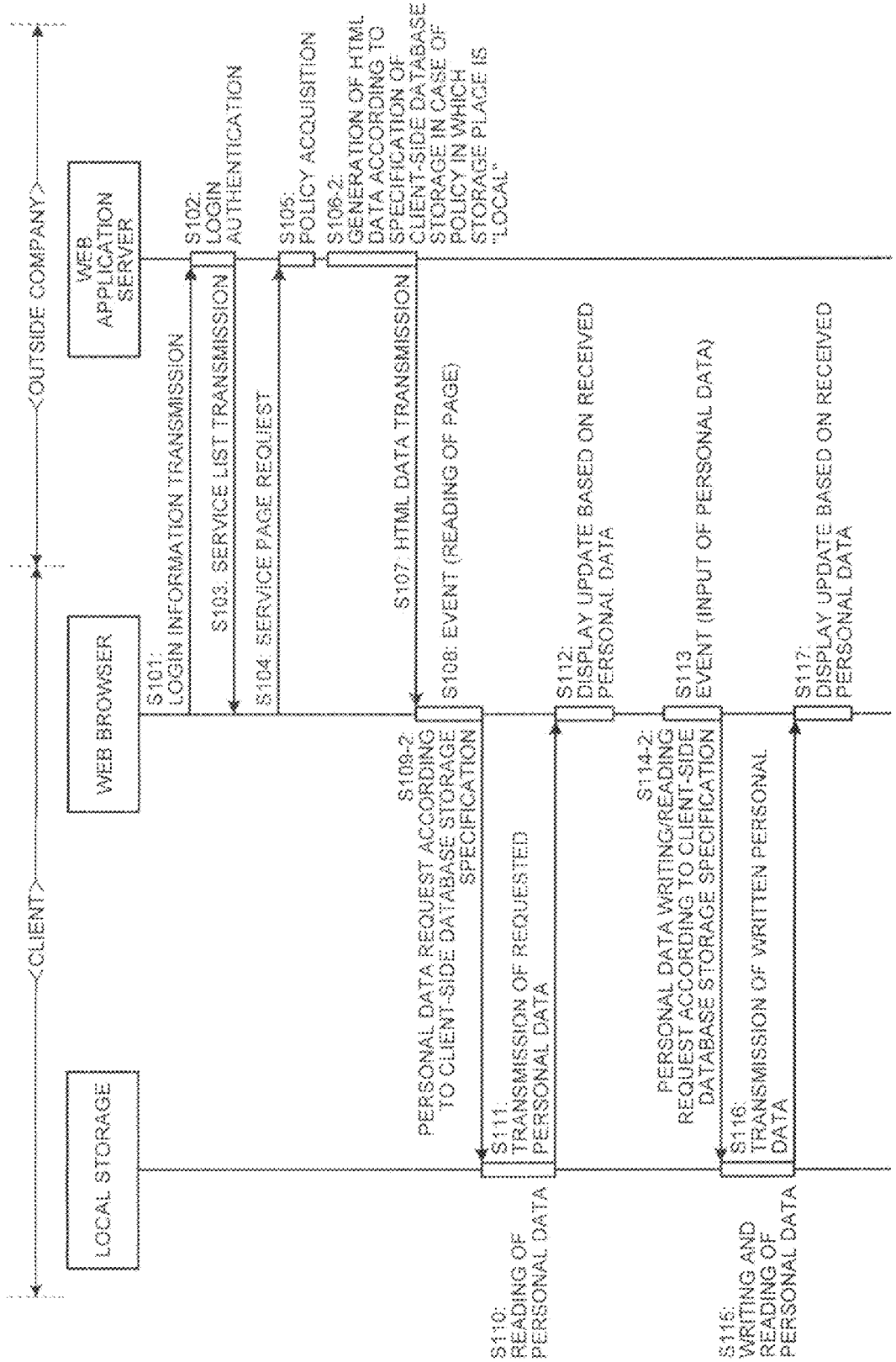
FIG. 10 is a sequence diagram of a process executed by a web service provision system according to the second embodiment.

The second embodiment will be described with reference to a sequence diagram illustrated in FIG. 10 in connection with a case in which "an accounting manager of a company C" uses the web service "calendar." In FIG. 10, the same process as described with reference to FIG. 5 will be denoted by the same step number, and a redundant description will not be repeated. Here, a description will be made focusing on a different process.

The web application server 100 retrieves the security policy management table 620 illustrated in FIG. 9 using an attribute of "the accounting manager of the company C" who has logged in (company C (company name), accounting department (department), and division manager (title)) as a key. As a result, acquired is a security policy having "local" as the storage place stored in a field indicated by an arrow in FIG. 9.

In the case of the security policy in which the storage place is "local," the web application server 100 generates an HTML file in which JavaScript (a registered trademark) to acquire the user's personal data from the local storage 400 is embedded (step S106-2). The HTML file may be generated according to a specification of a client-side database storage introduced in HTML 5. The generated HTML file is transmitted to the web browser 20 as the HTTP response (step S107).

When the received HTML file is read through the web browser 20 (step S108), JavaScript (a registered trademark) is triggered by such event and executed; and requested is personal data of "the accounting manager of the company C" stored in the local storage 400 connected to the client terminal 200 of "the accounting manager of the company C" (step S109-2).

In the case in which, after the calendar page is displayed, the user inputs personal data within the same session as that in which the calendar page is displayed, when the user "the accounting manager of the company C" inputs personal data through a predetermined personal data input interface provided by the web browser 20 (step S113), JavaScript (a registered trademark) is triggered by such event and executed; and transmitted is a request to write the input personal data in a file of "the accounting manager of the company C" stored in the local storage 400 connected to the client terminal 200 of "the accounting manager of the company C" and read the written personal data (step S114-2).

As described above, according to the second embodiment, highly confidential information is automatically stored in the local storage of the client, and thus an information leak risk can be reduced.

Further, according to a third embodiment of the present invention, the security policy may not be under the management of the web service provider but can be managed within the company. FIG. 11 is a network diagram of a web service provision system 40 according to the third embodiment. The web service provision system 40 according to the present embodiment is configured to include an intra-company policy server 420 connected to the intranet 14 in addition to the configuration illustrated in FIG. 1.

In the present embodiment, the security policy management unit 38 of the web application server 100 includes a security policy management table 640 illustrated in FIG. 12A. The security policy management table 640 exemplified in FIG. 12A is configured so that not only the user's attribute can be managed so as to be associated with the security policy (a storage place of personal data and a URL of the storage place), but also the user's attribute can be managed so as to be associated with a reference destination URL of the security policy itself.

Meanwhile, the intra-company policy server 420 maintains and manages security policies of an own company. FIG. 12B illustrates an example of a security policy management table 700 managed by the intra-company policy server 420 of the company C. The security policy management table 700 has the same configuration as the security policy management table 600 of the web application server 100 which has been described above except that it manages only the security policies of the own company. The third embodiment will be described with reference to a sequence diagram illustrated in FIG. 13 in connection with an example in which "the accounting manager of the company C" uses the web service "calendar." In FIG. 13, the same process as described with reference to FIG. 5 will be denoted by the same step number, and a redundant description will not be repeated. Here, a description will be made focusing on a different process.

The web application server 100 retrieves the security policy management table 640 illustrated in FIG. 12A using an attribute of "the accounting manager of the company C" that has logged in (company C (company name), accounting department (department), and division manager (title)) as a key; and refers to a field of the security policy corresponding to that attribute. In the example illustrated in FIG. 12A, a URL (intra.ccompany.co.jp/policy) of the intra-company policy server 420 arranged inside the intranet of the company C as the reference destination of the security policy is associated with all employees of the company C (a department and a title are wildcards) as indicated by an arrow in FIG. 12A. The web application server 100 acquires the URL of the intra-company policy server 420 (step S104-2). Thereafter, the web application server 100 generates a script to execute cross-domain communication to inquire the security policy to that URL (the intra-company policy server 420) and cross-domain communication in which the storage place of personal data described in the inquired security policy is set as the access destination (step S106-2).

The generated HTML file is transmitted to the web browser 20 (step S107). When the received HTML file is read by the web browser 20 (step S108), JavaScript (a registered trademark) is triggered by such event and executed; and the intra-company policy server 420 of the company C is inquired about the security policy using the attribute of "the accounting manager of the company C" as a key (step S108-2). This inquiry is made by cross-domain communication in which the URL (intra.ccompany.co.jp/policy) is set as the inquiry destination.

In response to the inquiry, the intra-company policy server 420 of the company C retrieves the security policy management table 700 illustrated in FIG. 12B using the received attribute of "the accounting manager of the company C" as a key; and transmits policy data including the security policy, in which the storage place is the inside of the company, and the URL is "intra.ccompany.co.jp/calender," stored in a field indicated by an arrow in FIG. 12B to the web browser 20 (step S108-2). The web browser 20 acquires the storage place of personal data of "the accounting manager of the company C" and the URL of the storage place from the received policy data; and makes a request to receive personal data of "the accounting manager of the company C" through XMLHttpRequest in which that URL (intra.ccompany.co.jp/caleder) is set as the communication destination (step S109-2).

Then, when "the accounting manager of the company C" inputs personal data (step S113), JavaScript (a registered trademark) is triggered by such event and executed; and so, in the same manner as described above, the intra-company policy server 420 of the company C is inquired about the security policy using the attribute of "the accounting manager of the company C" as a key. In response to the inquiry, the intra-company policy server 420 of the company C retrieves the security policy management table 700 and transmits policy data including the security policy, in which the storage place is the inside of the company, and the URL is "intra.ccompany.co.jp/calender," corresponding to the attribute of "the accounting manager of the company C" to the web browser 20 (step S113-2). The web browser 20 acquires the storage place of personal data of "the accounting manager of the company C" and the URL of the storage place from the received policy data; and transmits a request to write the input personal data in the file of "the accounting manager of the company C" and read the written personal data through XMLHttpRequest having that URL (intra.ccompany.co.jp/calender) as the communication destination (step S114-2).

As described above, according to the third embodiment, the security policy information needs not be placed in the SaaS server outside the company, and the security policy information can be freely changed inside the company, whereby usability is improved.

Lastly, a description will be made in connection with a fourth embodiment of the present invention. For example, it is convenient to link an address book application of an employee to the web service "meeting minute" provided by the web application server 100 since it is possible to immediately refer to a mail address of a member involved in a meeting minute application. However, if an address book of an employee is placed in the web application server 100, a security risk may be caused. In this regard, according to the fourth embodiment of the present invention, this problem can be solved by causing a web application server installed inside a company and a web application server installed outside a company to co-operate. This point will be described below.

Figure 14:
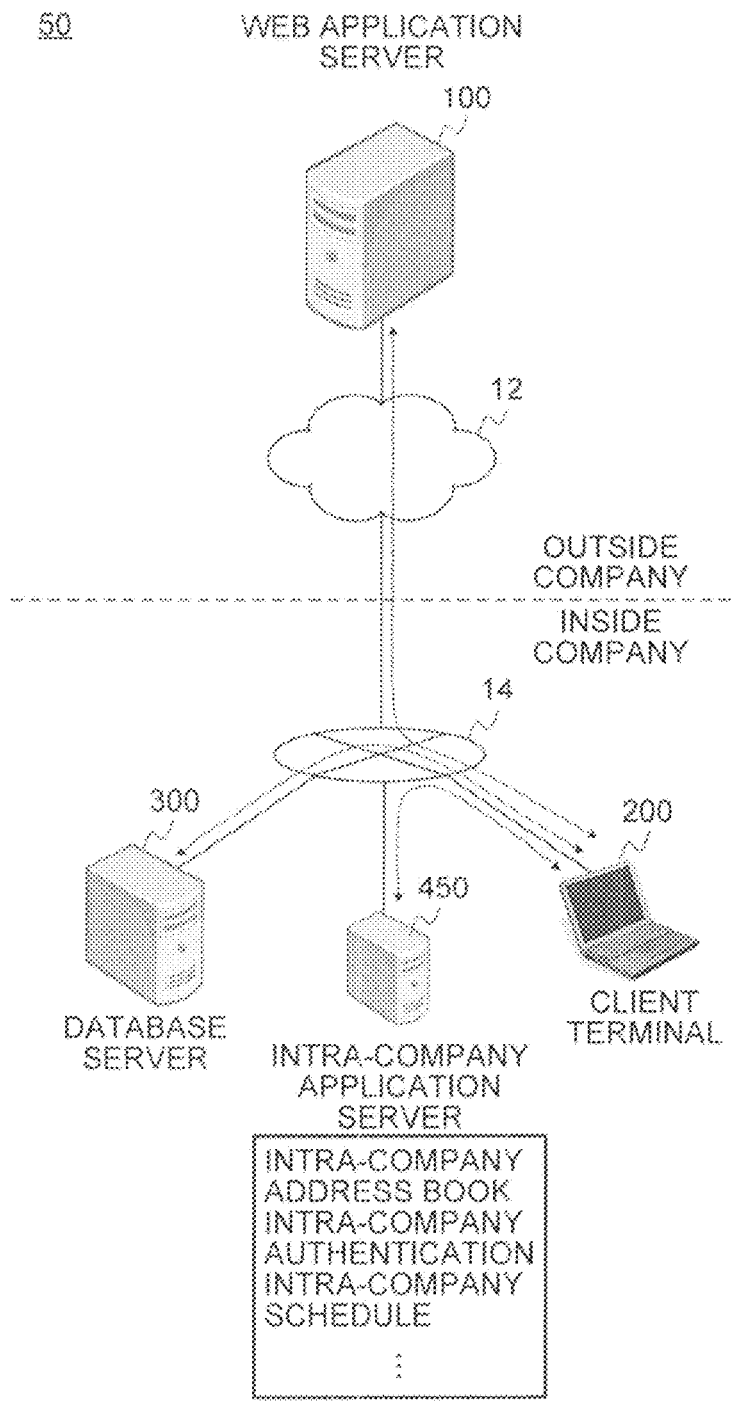
FIG. 14 is a network diagram of a web service provision system according to a fourth embodiment.

FIG. 14 is a network diagram of a web service provision system 50 according to a fourth embodiment. The web service provision system 50 according to the present embodiment is configured to include an intra-company application server 450 connected to the intranet 14 in addition to the configuration illustrated in FIG. 1. The intra-company application server 450 may include an address book application, an authentication application, a scheduler application, and the like. The intra-company application server 450 is configured to be accessible only by the web browser of the client inside the company through the intranet 14.

In the present embodiment, as illustrated in FIG. 15A, the security policy management unit 38 of the web application server 100 manages a security policy management table 800 that manages security policies defined for each service (an address book application in the illustrated example) provided by the intra-company application server 450 in addition to the security management policy table 600 that manages the security policies defined for each service provided by the web application server 100.

The security policy management table 800 and the security policy management table 600 have no difference in the configuration but are different only in a stored value. Specifically, in the security policy management table 800, as illustrated in FIG. 15B, a company name is described as attribute information (a department and a title are wildcards), and a storage place of data and a URL of the storage place are managed so as to be associated with the company name. Here, all of the storage places of data are designated as "inside of company," and URLs of address book applications of respective companies are described in URL fields.

Here, a description will be made in connection with an example in which "Suzuki of the sales department of the company A" uses the web service "meeting minute." The web application server 100 retrieves the security policy management table 600 illustrated in FIG. 15A using an attribute of "Suzuki of the company A" who has logged in (Suzuki (user name), company A (company name), sales department (department), and nothing (title)) as a key; and acquires a security policy, in which a storage place is "outside of company," and a URL is "-," stored in a field indicated by an arrow in FIG. 15A. In this case, when "Suzuki of the sales department of the company A" uses the web service "meeting minute"; his/her personal data is managed by the web application server 100 (outside the company).

In the present embodiment, as for the web service "meeting minute," the web application server 100 generates an HTML file so that personal data of "Suzuki of the sales department of the company A" is acquired by accessing data stored in the web application server 100, whereas a mail address of the company A's employee is acquired by accessing the address book application of the company A (the intra-company application server 450 of the company A) through cross-domain communication. As a result, a web application is linked with an intra-company application. Thus, the web application server 100 retrieves the security policy management table 800 illustrated in FIG. 15B using the attribute of "Suzuki of the company A" (Suzuki (user name), company A (company name), sales department (department), and nothing (title)) as a key; and acquires a URL of the address book application of the company A stored in a field indicated by an arrow in FIG. 15B.

As described above, according to the fourth embodiment, it is possible to cause a web application provided by the web application server 100 to freely call a relevant intra-company application (database) without causing a security risk.

As described above, according to the web service provision system of the present invention, information with low security request can be shared through the SaaS server outside the company similarly to the conventional SaaS outside the company, whereas some of information with high security request can be managed inside the company. A series of relevant procedures is automatically performed without being recognized by the user. Thus, according to the present invention, the information security risk inside the company can be reliably reduced without sacrificing usability of the user inside the company.

The embodiments of the present invention have been described above, but the present invention is not limited to the above embodiments. A range of an embodiment anticipated by a person having ordinary skill in the art is included within the scope of the present invention as long as it has an advantageous effect of the present invention.

Further, the functions of the above embodiments may be implemented by a device-executable program, for example, described in a legacy programming language or an object-oriented program language such as an assembly language, C, visual C, C++, visual C++, Java (a registered trademark), Java (a registered trademark) Beans, Java (a registered trademark) Applet, JavaScript (a registered trademark), Perl, or Ruby. Further, the functions of the above embodiments may be distributed in a form stored in a device-readable recording medium.

According to further aspect of the present invention there is provided a web service provision system, including: a web application server that executes a web application; a client terminal on which a web browser is installed; and a local storage of the client terminal that stores a database. The web application server includes a user information management unit that manages user IDs and attributes such that each of the user IDs is associated with corresponding one of the attributes, a security policy management unit that manages security policies such that each of the security policies is associated with corresponding one of the attributes, each of the security policy defining the web application server or the database stored in the local storage as a storage destination of personal data of corresponding one of users, a security policy acquisition unit that acquires one of the security policies based on one of the attributes associated with one of the user IDs transmitted from the web browser, and an HTML file generation unit that generates an HTML file based on the one of the security policies acquired by the security policy acquisition unit.

In this aspect, the HTML file generation unit may generate the HTML file in which a script to acquire the personal data of the corresponding one of the users from the database according to a specification of a client-side database storage is embedded when the storage destination of the personal data of the corresponding one of the users is the database stored in the local storage, and the web browser may acquire the personal data of the corresponding one of the users from the database and generates an HTML page in which the personal data of the corresponding one of the users is reflected, by executing the script in the HTML file received from the web application server.

According to further aspect of the present invention, there is provided a web service provision system, including: a web application server that executes a web application; a client terminal having a web browser installed thereon; a database server connected to the client terminal through an intranet; and a security policy server that is connected to the client terminal through an intranet and manages security policies each defining the web application server or the database server as a storage destination of personal data of corresponding one of users such that each of the security policies is associated with corresponding one of attributes of the corresponding one of the users. The web application server includes a user information management unit that manages user IDs such that each of the user IDs is associated with corresponding one of the attributes, a security policy management unit that manages a URL of the security policy server so as to be associated with at least one of the attributes, and an HTML file generation unit that generates an HTML file based on one of the security policies.

In this aspect, the HTML file generation unit may generate an HTML file in which a script to execute cross-domain communication designating the URL of the security policy server to acquire one of the security policies corresponding to one of the attributes of one of the users, and a script to execute cross-domain communication designating a URL of the database server to acquire the personal data of the one of the users when the storage destination of the personal data of the one of the users described in the one of the security policies is the database server are embedded. The web browser may acquire the personal data of the one of the users from the database server and generates an HTML page in which the personal data is reflected, by executing the script in the HTML file received from the web application server.

According to further aspect of the present invention, there is provided a web service provision system, including: a web application server that executes a web application; a client terminal on which a web browser is installed; and a database server connected to the client terminal through an intranet. The web application server includes: a user information management unit that manages user IDs and attributes such that each of the user IDs is associated with corresponding one of the attributes, a security policy management unit that manages security policies such that each of the security policies is associated with corresponding one of the attributes, each of the security policies defining the web application server or the database server as a storage destination of personal data of corresponding one of users, a security policy acquisition unit that acquires one of the security policies based on one of the attributes associated with one of the user IDs transmitted from the web browser, and an HTML file generation unit that generates an HTML file based on the one of the security policies acquired by the security policy acquisition unit. The security policy management unit manages a further security policy defining an application server connected to the client terminal through an intranet as the storage destination of personal data of a further user. The HTML file generation unit generates an HTLM file in which a script to execute cross-domain communication designating a URL of the application server to acquire the personal data of the further user is embedded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A web service provision system, comprising:
  a web application server that executes at least one or more web applications;
  a web browser installed on a client terminal through which a web service provided by the web application server is utilized;
  a user information management unit that manages user IDs and attributes such that each of the user IDs is associated with at least one of the attributes; and
  a storage destination management unit that manages a first storage destination of personal data of at least one user such that the first storage destination is associated with at least one of the attributes, wherein
  the web browser acquires, based on at least one of the attributes associated with a user ID of the user that is transmitted from the web browser to utilize the web service, information identifying a second storage destination connected to an internet or the first storage destination connected to an intranet, from which personal data of a user is to be acquired, and accesses the first storage destination connected to the internet or the second storage destination connected to the intranet to acquire the personal data of the user, based on the acquired information, the acquired information including information identifying whether to access the first storage destination connected to the intranet managed by the storage destination management unit or the second storage destination connected to the internet.

2. The web service provision system according to claim 1, wherein
  the storage destination management unit is a security policy management unit that manages a security policy such that the security policy is associated with at least one of the attributes, and
  the security policy defines the second storage destination connected to the internet or the first storage destination connected to the intranet as a storage destination of personal data of at least one user.

3. The web service provision system according to claim 2, further comprising:
  an HTML file generation unit that generates an HTML file based on the one of the security policies acquired by a security policy acquisition unit.

4. The web service provision system according to claim 3, wherein
  the HTML file generation unit generates the HTML file such that a script to execute cross-domain communication designating a URL of a database server to acquire the personal data of the corresponding at least one of the users is embedded when the storage destination of the personal data of the corresponding at least one of the users is the database server, and
  the web browser acquires the personal data of the corresponding at least one of the users from the database server and generates an HTML page in which the personal data of the corresponding at least one of the users is reflected, by executing the script in the HTML file received from the web application server.

5. The web service provision system according to claim 1, further comprising:
  a policy server connected to the intranet, the policy server including a security policy management unit,
  wherein the web browser accesses the policy server to acquire the information identifying the second storage destination connected to the internet or the first storage destination connected to the intranet, from which personal data of a user is to be acquired.

6. The web service provision system according to claim 1, wherein the web application server includes the user information management unit and the storage destination management unit.

7. The web service provision system according to claim 1, wherein the storage destination managed by the storage destination management unit indicates the web application server connected to the internet or a database server connected to the intranet.

8. The web service provision system according to claim 1, wherein the storage destination managed by the storage destination management unit indicates the web application server connected to the internet or a local storage of the client terminal connected to the intranet.

9. The web service provision system according to claim 1, wherein
  the web application server includes a first web application server connected to the internet and a second web application server connected to the intranet, and
  the storage destination managed by the storage destination management unit indicates an application of the second web application server.

10. The web service provision system according to claim 1, wherein the web service includes at least one of a calendar, meeting minute, photograph management, and address book.

11. The web service provision system according to claim 1, wherein the acquiring information further includes location information identifying a location of the first storage destination.

12. A web service provision method, comprising:
  executing, at web application server, at least one or more web applications;
  utilizing, via a web browser installed on a client terminal, a web service provided by the web application;
  managing, via a user information management unit, user IDs and attributes such that each of the user IDs is associated with at least one of the attributes; and
  managing, via a storage destination management unit, a first storage destination of personal data of at least one user such that the first storage destination is associated with at least one of the attributes,
  wherein the web browser acquires, based on at least one of the attributes associated with a user ID of the user that is transmitted from the web browser to utilize the web service, information identifying a second storage destination connected to an internet or the first storage destination connected to an intranet, from which personal data of a user is to be acquired, and accesses the first storage destination connected to the internet or the second storage destination connected to the intranet to acquire the personal data of the user, based on the acquired information, the acquired information including information identifying whether to access the first storage destination connected to the intranet managed by the storage destination management unit or the second storage destination connected to the internet.

13. The web service provision method according to claim 12, wherein
the storage destination management unit is a security policy management unit that manages a security policy such that the security policy is associated with at least one of the attributes, and
the security policy defines the second storage destination connected to the internet or the first storage destination connected to the intranet as a storage destination of personal data of at least one user.

14. The web service provision method according to claim 13, further comprising:
an HTML file generation unit that generates an HTML file based on the one of the security policies acquired by a security policy acquisition unit.

15. The web service provision method according to claim 14, wherein
the HTML file generation unit generates the HTML file such that a script to execute cross-domain communication designating a URL of a database server to acquire the personal data of the corresponding at least one of the users is embedded when the storage destination of the personal data of the corresponding at least one of the users is the database server, and
the web browser acquires the personal data of the corresponding at least one of the users from the database server and generates an HTML page in which the personal data of the corresponding at least one of the users is reflected, by executing the script in the HTML file received from the web application server.

16. The web service provision method according to claim 12, wherein the web application server includes the user information management unit and the storage destination management unit.

17. The web service provision method according to claim 12, wherein the storage destination managed by the storage destination management unit indicates the web application server connected to the internet or a database server connected to the intranet.

18. The web service provision method according to claim 12, wherein
the web application server includes a first web application server connected to the internet and a second web application server connected to the intranet, and
the storage destination managed by the storage destination management unit indicates an application of the second web application server.

19. The web service provision method according to claim 12, wherein the web service includes at least one of a calendar, meeting minute, photograph management, and address book.

20. A terminal, comprising:
processing circuitry configured to operate a web browser through which a web service provided by web application server is utilized, the web application server executing at least one or more web applications, managing user IDs and attributes such that each of the user IDs is associated with at least one of the attributes, and managing a first storage destination of personal data of at least one user such that the first storage destination is associated with at least one of the attributes,
wherein the web browser acquires, based on at least one of the attributes associated with a user ID of the user that is transmitted from the web browser to utilize the web service, information identifying a second storage destination connected to an internet or the first storage destination connected to an intranet, from which personal data of a user is to be acquired, and accesses the first storage destination connected to the internet or the second storage destination connected to the intranet to acquire the personal data of the user, based on the acquired information, the acquired information including information identifying whether to access the first storage destination or the second storage destination connected to the internet.

* * * * *